JOSHUA H. MARVIL.
Improvement in Fruit and Berry-Boxes or Baskets.
No. 114,456.　　　　　　　　　　Patented May 2, 1871.
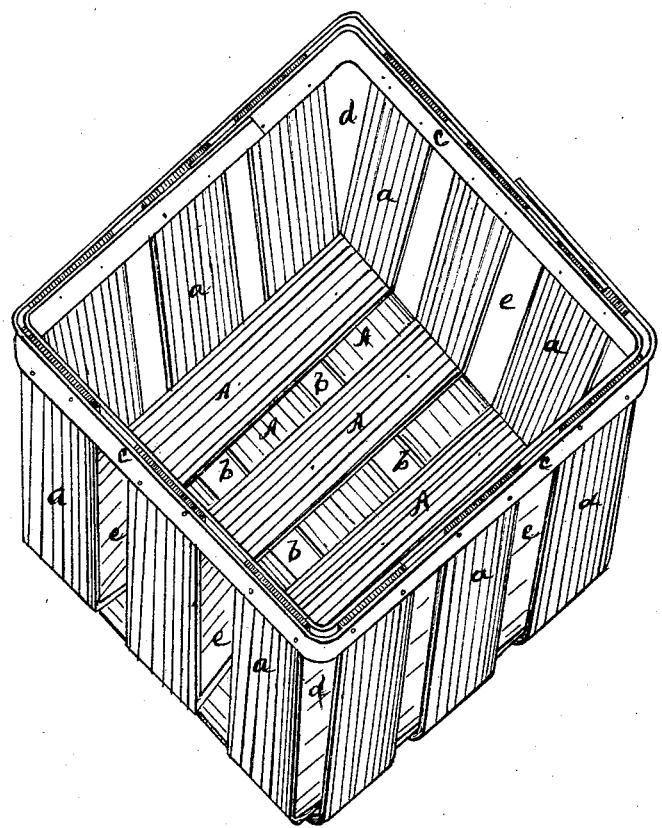
Witnesses:　　　　　　　　　　Inventor.

UNITED STATES PATENT OFFICE.

JOSHUA H. MARVIL, OF LAUREL, DELAWARE.

IMPROVEMENT IN FRUIT AND BERRY BOXES OR BASKETS.

Specification forming part of Letters Patent No. 114,456, dated May 2, 1871.

*To all whom it may concern:*

Be it known that I, JOSHUA H. MARVIL, of Laurel, Sussex county, State of Delaware, have invented a new and useful Improvement in Fruit and Berry Boxes or Baskets; and I do hereby declare the following to be a clear and exact description thereof, sufficient to enable others skilled in the art to make and use the same, reference being had to the accompanying drawing, making part of this specification, in which the figure is a perspective view of my box or basket.

The invention relates to an improved fruit, vegetable, and berry box or basket; and consists of a number of slats or strips of wood or other material secured together at right angles, with their ends bent upwardly at an acute angle, and bound together by strips of wood, metal, &c., in such a manner as to form flaring sides for the box, and these strips are so arranged as to leave interstices between them both in the bottom and in the sides, whereby air is more readily admitted to the fruit or berries, and consequently they are better preserved.

The corners of the box are left open, the result of making the sides flaring, and the fruit or berries are allowed more space, and, when packed, are not subject to being mashed or otherwise damaged.

Referring to the drawing, the letters A A designate slats or thin strips of wood, pasteboard, or other material, secured together by tacks, &c., at right angles, or nearly so, in such a manner as to leave spaces or openings $b\ b$ between them, which serve to admit air into the box among the fruit, and also allow the juice, which would otherwise accumulate, to run out, and thus preserve the rest of the fruit or vegetables from being corrupted by it.

The ends $a\ a$ of these strips are bent or cut, and turned up at an acute angle to the bottom, and are secured together by strips $c\ c$, of metal, wood, &c., which bind their edges. These ends $a\ a$ are so arranged as that the sides of the box shall be flaring, and thus the corners $d\ d$ are left open, while formerly they were closed; and the advantage gained by this construction is that the fruit is prevented from being crowded or jammed into these corners and damaged, and at the same time, in conjunction with the interstices $e\ e$ and openings $b\ b$, a thorough ventilation or passage of air through the fruit is had, which still further prevents the decaying of the fruit.

The box is to be used for the packing and transportation of the fruits, vegetables, berries, and other like substances, as is usual; but it will, from the advantages above set forth, be found much better adapted for these purposes than those in common use, while its cost is much less than some, and its durability in no wise impaired.

Having thus described my invention, what I claim as new, and desire to secure by Letters Patent, is—

A fruit, vegetable, or berry box constructed as described—that is to say, having strips or slats A A arranged at right angles to each other, and their ends $a\ a$ bent up so as to form flaring sides, the whole being secured together in such a manner as to leave openings or interstices $a\ b\ d\ e$, as and for the purpose specified.

To the above specification I have signed my name this 13th day of April, A. D. 1871.

JOSHUA H. MARVIL.

Witnesses:
   WILLIAM F. LAMB,
   KATESBY R. TORBERT.